US012686329B2

(12) United States Patent　　　(10) Patent No.: US 12,686,329 B2
Tsuchiya et al.　　　　　　　　　　(45) Date of Patent:　　Jul. 21, 2026

(54) VEHICLE CONTROL DEVICE AND VEHICLE CONTROL METHOD

(71) Applicants: NISSAN NORTH AMERICA, INC., Franklin, TN (US); NISSAN MOTOR CO., LTD., Yokohama (JP)

(72) Inventors: Chikao Tsuchiya, Cupertino, CA (US); Kanako Sakai, Inagi (JP)

(73) Assignees: NISSAN NORTH AMERICA, INC., Franklin, TN (US); VANDERBILT UNIVERSITY, Nashville, TN (US)

( * ) Notice: Subject to any disclaimer, the term of this patent is extended or adjusted under 35 U.S.C. 154(b) by 160 days.

(21) Appl. No.: 18/618,247

(22) Filed: Mar. 27, 2024

(65) Prior Publication Data

US 2025/0303957 A1　　Oct. 2, 2025

(51) Int. Cl.
　　　*B60Q 1/34*　　　　(2006.01)
　　　*B60Q 1/50*　　　　(2006.01)

(52) U.S. Cl.
　　　CPC ............. *B60Q 1/346* (2013.01); *B60Q 1/507* (2022.05); *B60Q 2800/10* (2022.05)

(58) Field of Classification Search
　　　CPC ..... B60Q 1/346; B60Q 1/507; B60Q 2800/10
　　　USPC ........................................ 340/465
　　　See application file for complete search history.

(56) References Cited

U.S. PATENT DOCUMENTS

| | | | | |
|---|---|---|---|---|
| 2018/0244195 A1 * | 8/2018 | Haight | ................. | G01S 13/862 |
| 2019/0310633 A1 * | 10/2019 | Toyoda | ............... | B60W 50/085 |
| 2023/0051632 A1 * | 2/2023 | Bellare | ................. | B60W 30/16 |
| 2023/0311747 A1 * | 10/2023 | Horiguchi | .............. | B60Q 1/346 |
| | | | | 340/468 |
| 2025/0187532 A1 * | 6/2025 | Lawand | .................. | B60Q 9/00 |

FOREIGN PATENT DOCUMENTS

| | | | | | |
|---|---|---|---|---|---|
| CN | 101287634 | A | * | 10/2008 | |
| CN | 114555419 | B | * | 8/2023 | ............... B60Q 1/40 |
| GB | 2579024 | A | * | 6/2020 | ............... B60Q 1/12 |
| JP | 2017124771 | A | * | 7/2017 | |
| WO | WO-2024218225 | A1 | * | 10/2024 | ............ B60Q 1/346 |
| WO | WO-2025169222 | A1 | * | 8/2025 | ............ B60Q 1/346 |

* cited by examiner

*Primary Examiner* — Eric Blount
(74) *Attorney, Agent, or Firm* — Spencer Fane, LLP

(57)　　　　　　ABSTRACT

A vehicle control device includes a computer memory, an environmental sensor and a processor. The computer memory is configured to store vehicle trajectories in association with road segments of a map. The environmental sensor is configured to detect traveling environment of a host vehicle. The processor is configured to determine one of the vehicle trajectories along which the host vehicle is traveling, determine whether switching from the one of the vehicle trajectories to the other one of the vehicle trajectories is needed, and control a turn signal of the host vehicle according to a detection result of the environment sensor in response to determining that the switching from the one of the vehicle trajectories to the other one of the vehicle trajectories is needed.

15 Claims, 10 Drawing Sheets

VEHICLE CONTROL DEVICE AND VEHICLE CONTROL METHOD

BACKGROUND

Technical Field

The present disclosure generally relates to a vehicle control device and a vehicle control method. More specifically, the present disclosure relates to a vehicle control device and a vehicle control device for controlling a vehicle.

Background Information

Driving support control systems are increasingly common in modern vehicles. The driving support control systems aim to enhance driver awareness, responsiveness, and overall safety on the road. These technologies are advancing rapidly with the development of autonomous driving technologies.

SUMMARY

Autonomous driving systems aim to perform all driving tasks without human intervention, which typically requires the vehicle to be provided with large amount of map data or point clouds to navigate complex environments. For example, HD (High Definition) maps have been proposed for presenting a highly accurate and realistic representation of the road, such as lane models, traffic signs, road furniture and lane geometry to realize autonomous driving, especially, in urban areas. However, these HD maps need to be constantly updated to ensure the utilization of the maps, which increases the costs of creating and maintaining the maps.

The present disclosure is directed to various features of a vehicle control device and a vehicle control method.

In view of the state of the known technology, one aspect of the present disclosure is to provide a vehicle control device comprising a computer memory, an environmental sensor and a processor. The computer memory is configured to store vehicle trajectories in association with road segments of a map. The environmental sensor is configured to detect traveling environment of a host vehicle. The processor is configured to determine one of the vehicle trajectories along which the host vehicle is traveling, determine whether switching from the one of the vehicle trajectories to the other one of the vehicle trajectories is needed, and control a turn signal of the host vehicle according to a detection result of the environment sensor in response to determining that the switching from the one of the vehicle trajectories to the other one of the vehicle trajectories is needed.

In view of the state of the known technology, another aspect of the present disclosure is to provide a vehicle control method comprising storing vehicle trajectories in association with road segments of a map, determining one of the vehicle trajectories along which a host vehicle is traveling, determining whether switching from the one of the vehicle trajectories to the other one of the vehicle trajectories is needed, and controlling a turn signal of the host vehicle according to a detection result of traveling environment of the host vehicle in response to determining that the switching from the one of the vehicle trajectories to the other one of the vehicle trajectories is needed.

Also other features, aspects and advantages of the disclosed vehicle control device and vehicle control method will become apparent to those skilled in the field of manufacturing vehicles from the following detailed description, which, taken in conjunction with the annexed drawings, discloses several illustrative embodiments of a vehicle with various features.

BRIEF DESCRIPTION OF THE DRAWINGS

Referring now to the attached drawings which form a part of this original disclosure.

Figure 1:
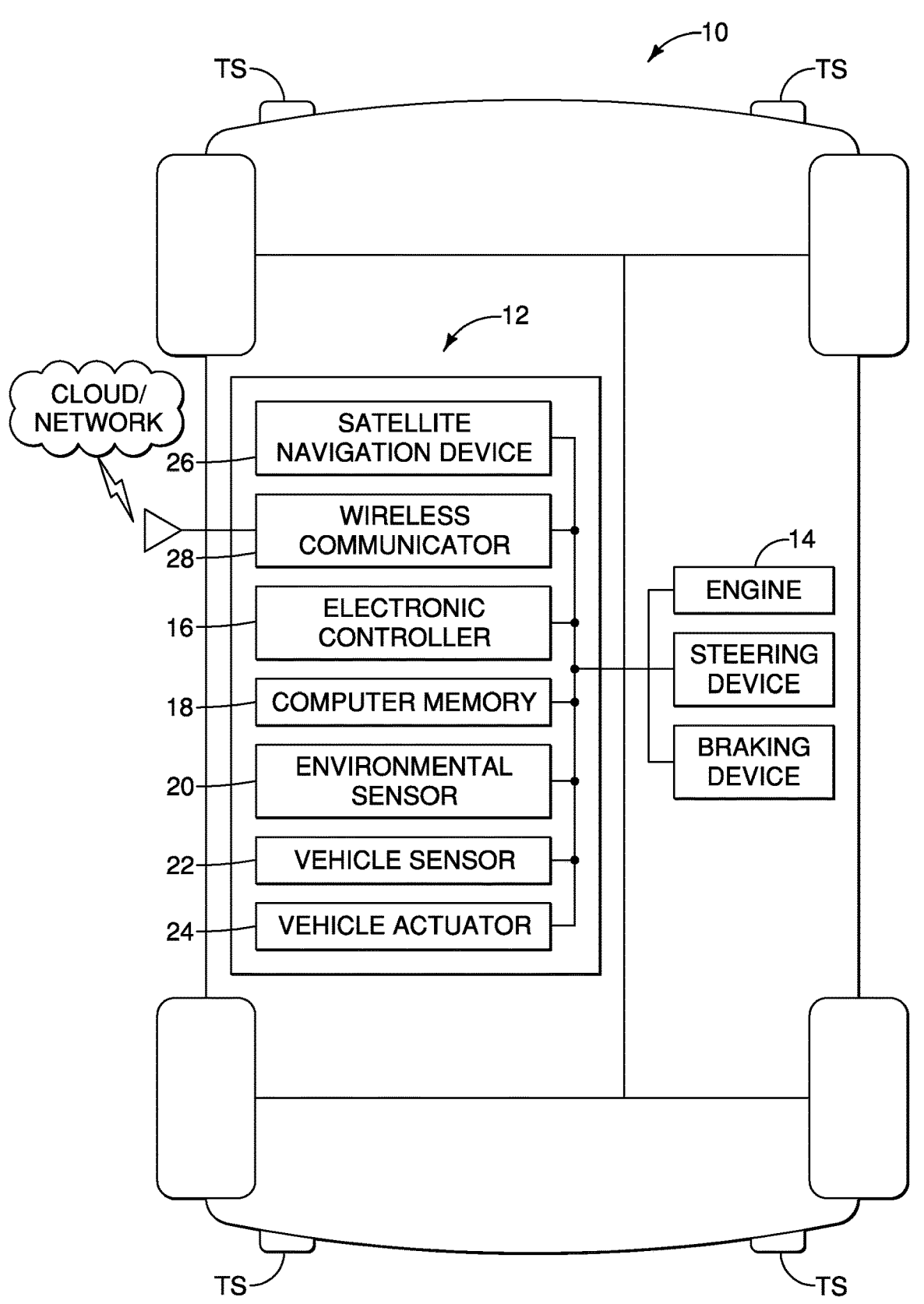
FIG. 1 is a schematic plan view of a vehicle equipped with a vehicle control device in accordance with an illustrated embodiment.

It should be noted that these figures are intended to illustrate the general characteristics of methods, structure and/or materials utilized in certain illustrative embodiments and to supplement the written description provided below. These drawings are not to scale and may not precisely reflect the precise structural or performance characteristics of any given embodiment, and should not be interpreted as defining or limiting the range of values or properties encompassed by illustrative embodiments unless specified. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring to FIG. 1, a vehicle 10 (e.g., a host vehicle) according to one embodiment of the present disclosure will be described. In the illustrated embodiment, the vehicle 10 is equipped with a vehicle control device 12. In the illustrated embodiment, the vehicle control device 12 includes a driving support system that supports driving of the vehicle 10. The term "driving support system" as used herein may include an autonomous driving control and a driving assist control. The autonomous driving control performs all driving tasks without human intervention, such as automatically navigating the vehicle 10 along a planned route without human intervention. The driving assist control are designed assist the driver in a limited range of functions focused on specific driving tasks but still require human supervision and/or input. In either case, in the illustrated embodiment, the driving support system according to the present disclosure assists the driver at least in operations of turn signals TS of the vehicle 10, as described below in detail. Furthermore, in the illustrated embodiment, the driving support system according to the present disclosure assists the driver at least in operations of lane change of the vehicle 10, as described below in detail. In the illustrated embodiment, an example is illustrated in which the driving support system is integrated with the vehicle control device 12. However, the driving support system can be a separate system from the vehicle control device 12 and be operated according to instructions or information from the vehicle control device 12.

As also seen in FIG. 1, the vehicle 10 is also equipped with a vehicle engine 14 and other conventional vehicle components, such as a steering device, a braking device, etc. The vehicle engine 14 generates a torque output of the vehicle 10 in accordance with the operation of the vehicle pedal by the driver. The torque output generated by the vehicle engine 14 is then transferred to the wheels of the vehicle 10 through the transmission and the drivetrain of the vehicle 10 in a conventional manner. The vehicle engine 14 can be further equipped with an electronic control unit (ECM). In particular, the ECM controls a torque output of the vehicle engine 14. In the illustrated embodiment, the vehicle engine 14 includes an internal combustion engine. Alternatively, the vehicle 10 can be a hybrid or an electric vehicle, or be operated by a hydrogen powertrain.

In the illustrated embodiment, the vehicle control device 12 includes an electronic control unit or controller 16 (e.g., a processor) and a computer memory 18. The electronic controller 16 includes one or more processor(s) for controlling the various operations of the vehicle 10, as will be further described. In the illustrated embodiment, the electronic controller 16 is preferably a microcomputer (MPU) or central processing unit (CPU). The electronic controller 16 is formed of one or more semiconductor chips that are mounted on a circuit board. The term "electronic control unit" or "electronic controller" as used herein refers to hardware that executes a software program, and does not include a human being. The MPU or CPU may be one or more integrated circuits having firmware for causing the circuitry to complete the activities described herein. Of course, any number of other analog and/or digital components capable of performing the functionality described below can be provided in place of, or in conjunction with the electronic controller 16.

The computer memory 18 is any memory or storage device. Here, for example, the computer memory 18 includes a transitory or non-transitory computer-readable medium with the sole exception of a transitory propagating signal. Thus, the computer memory 18 can include nonvolatile memory and volatile memory, and can include at least one of an internal memory, or other type of memory devices such as a read-only memory (ROM), an erasable programmable read only memory (EPROM), an electrically erasable programmable read-only memory (EEPROM), a random access memory (RAM), a hard disk, a flash drive, etc. The computer memory 18 stores various control processes or control programs as well as information or data used by the electronic controller 16. Thus, the computer memory 18 is electrically connected to the electronic controller 16. In this way, the electronic controller 16 can retrieve data and access programs stored in the computer memory 18, and can store data to the computer memory 18. As explained below, the computer memory 18 preferably includes non-volatile memory that is configured to store various control programs (e.g., a program for a vehicle control method, etc.), operational data, component identification data, etc.

In the illustrated embodiment, the vehicle control device 12 further includes an environmental sensor 20. The environmental sensor 20 detects traveling environment of the vehicle 10, as will be further discussed below. For example, the environmental sensor 20 can be equipped with one or more unidirectional or omnidirectional external cameras that take moving or still images of the traveling environment or surroundings of the vehicle 10. The environmental sensor 20 can also include infrared detectors, ultrasonic detectors, radar detectors, photoelectric detectors, magnetic detectors, acceleration detectors, acoustic/sonic detectors, gyroscopes, lasers or any combination thereof. The environmental sensor 20 can also include object-locating sensing devices including range detectors, such as FM-CW (Frequency Modulated Continuous Wave) radars, pulse and FSK (Frequency Shift Keying) radars, sonar and Lidar (Light Detection and Ranging) devices. The data from the environmental sensor 20 can be used to detect the traveling environment of the vehicle 10, as will be further described below. In any case, in the illustrated embodiment, the environmental sensor 20 includes at least one of a lidar sensor (Lidar), a radar sensor (radar) and an image sensor (camera).

In the illustrated embodiment, the vehicle control device 12 further includes a vehicle sensor 22, a vehicle actuator 24, a satellite navigation device 26 and a wireless communicator 28. The vehicle sensor 22 includes various sensors to detect driving states of the vehicle 10. For example, the vehicle sensor 22 includes a vehicle speed sensor, a yaw rate sensor, a torque sensor, etc. The vehicle speed sensor can measure wheel speed of the vehicle 10 in a conventional manner to detect current vehicle speed of the vehicle 10. The yaw rate sensor detects the yaw rate generated in the vehicle 10 in a conventional manner. The torque sensor can measure the torque on the crankshaft of the vehicle engine 14 in a conventional manner.

The vehicle actuator 24 is operatively connected to the electronic controller 16 to operate vehicle components of the vehicle 10 according to the autonomous driving control and/or the driving assist control. Specifically, the vehicle actuator 24 includes a steering actuator, a brake control actuator, etc. The steering actuator operates the steering device of the vehicle 10 to control the steering angle of the vehicle 10. The brake control actuator operates the braking device to control the deceleration of the vehicle 10. In the illustrated embodiment, the electronic controller 16 can be in communication with the ECM of the vehicle engine 14 to operate the vehicle engine 14 to control the acceleration of the vehicle 10. However, the vehicle actuator 24 can further include an accelerator opening actuator that operates the throttle of the vehicle engine 14 to control the acceleration of the vehicle 10.

The satellite navigation device 26 includes a global navigation satellite system (GNSS) receiver. In the illustrated embodiment, the GNSS receiver can be a global positioning system (GPS) receiver, for example. The satellite navigation device 26 receives radio waves from a plurality of navigation satellites to obtain information that represents, for example, a current vehicle heading of the vehicle 10, a current vehicle position of the vehicle 10 in two or three dimensions, a current vehicle angular orientation of the vehicle 10, or a combination thereof.

The wireless communicator 28 is in wireless communications to at least one of cloud services and a vehicle network. The wireless communicator 28 is a hardware device capable of transmitting and/or receiving an analog or digital signal wirelessly via an antenna. The terms "wireless communicator" as used herein include a receiver, a transmitter, a transceiver, or a transmitter-receiver, for example.

In the illustrated embodiment, the vehicle control device 12 can be further equipped with any other vehicle components, such as a user interface with a display screen that is configured to display various information to the driver.

Figure 2:
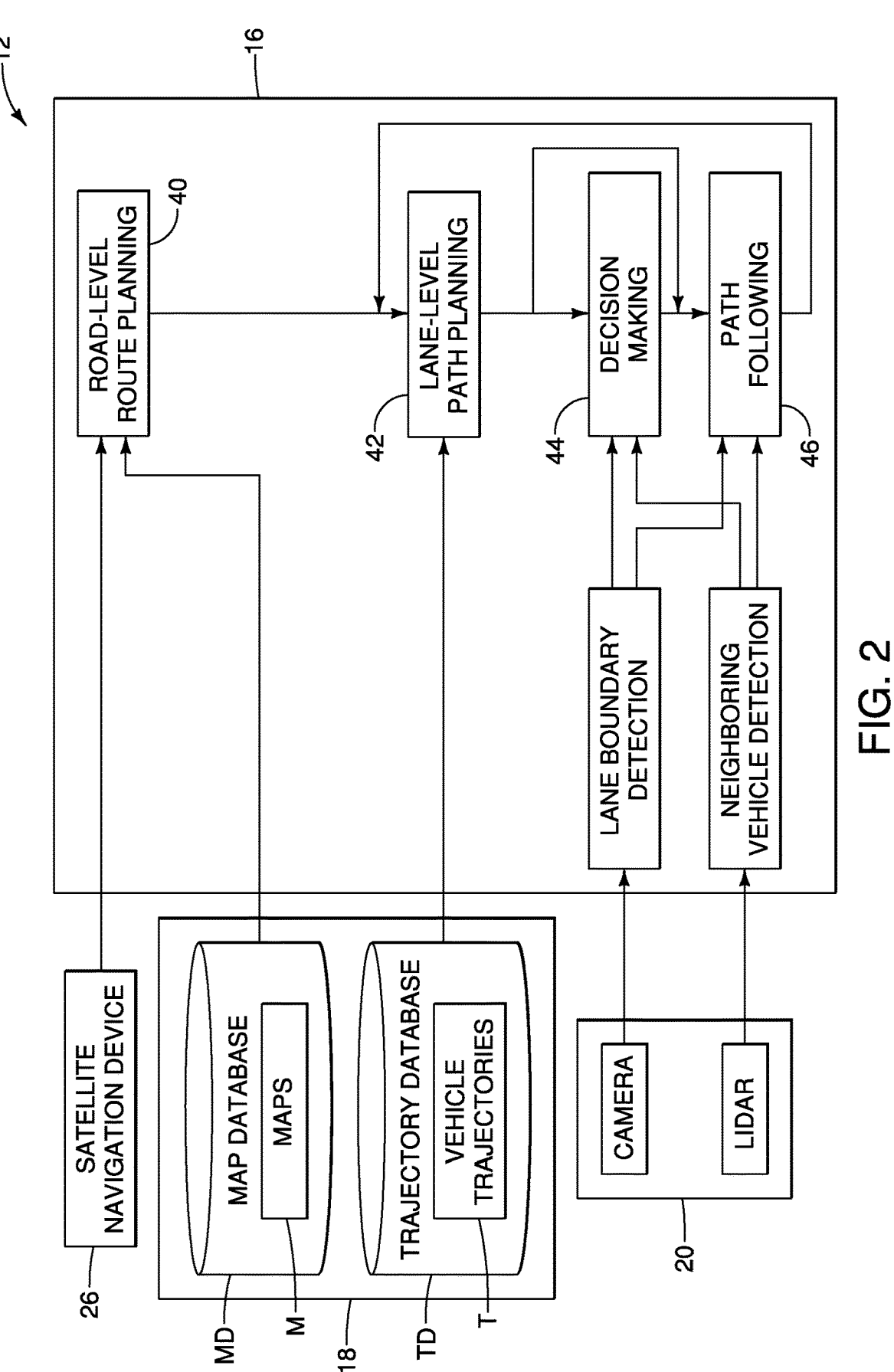
FIG. 2 is a functional block diagram showing a vehicle control of the vehicle control device illustrated in FIG. 1.

FIG. 2 illustrates a functional block diagram of a vehicle control (e.g., a vehicle control method) of the vehicle control device 12 in accordance with the present disclosure. In the illustrated embodiment, the vehicle control of the vehicle control device 12 includes a path following control that is performed as part of the autonomous driving control or the driving assist control. Specifically, with the vehicle control of the present disclosure, a target vehicle path with lane change can be generated from map database having no detailed road structure, such as lane-level geometry, road boarders and guardrails, lane connectivity, etc., for road segments, and the vehicle 10 can be controlled to follow the target vehicle path.

Figure 3:
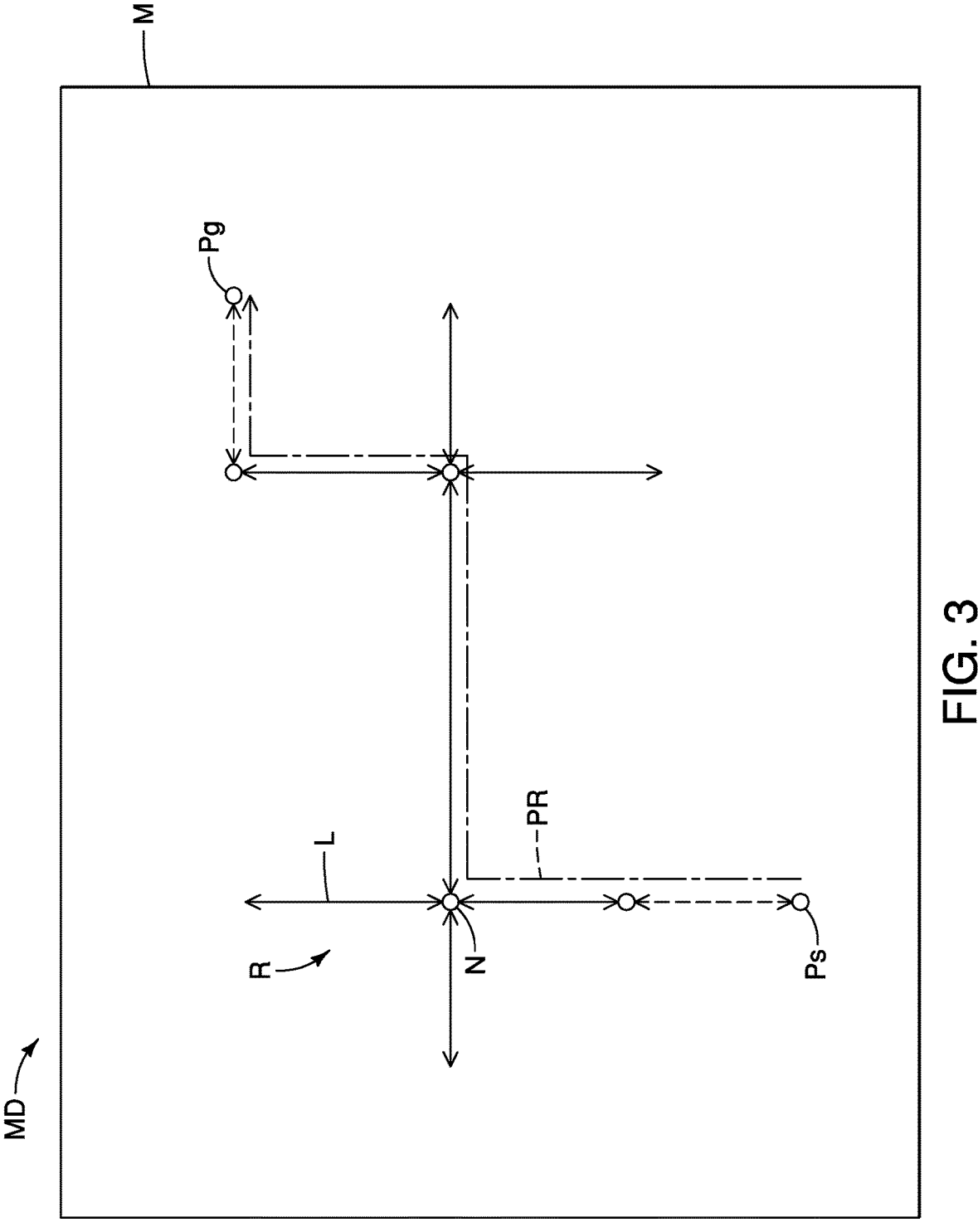
FIG. 3 is a schematic diagram showing a map data model of a map stored in a computer memory of the vehicle control device illustrated in FIG. 1, with the map data model being formed by map nodes and map links.

As seen in FIG. 2, the computer memory 18 stores map database MD having position information for road segments. In the illustrated embodiment, the map database MD can be a navigation map that is different from the so-called HD (High Definition) maps that have been proposed recently. Thus, the map database MD does not have detailed road structure, such as lane-level geometry, road boarders and guardrails, lane connectivity, etc., for road segments. In particular, as seen in FIG. 3, the map database MD include at least one map M each formed by map nodes N (shown by solid or dotted arrows) and map links L (shown by dots) that provide spatial framework or road network for route planning or navigation guidance. The map nodes N each indicate a point or location on the map M, representing an intersection or a junction. The map links L each indicate a connection or path between two map nodes N on the map M, representing roads, streets, highways or pathways (i.e., road segments R) that connect different locations on the map M. Furthermore, the map database MD stores the map nodes N and the map links L in association with their specific positions or geographic coordinates (e.g., GPS coordinates).

As also seen in FIG. 2, the computer memory 18 also stores trajectory or exemplar database TD having vehicle trajectories T. The vehicle trajectories T include histories of traveling paths that the vehicle 10 and/or other vehicles have taken over a period of time. The histories of traveling paths are recorded by the vehicle 10 and/or other vehicles as a time-series data of GPS coordinates associated with the vehicle speeds and/or the yaw rates. In the illustrated embodiment, the GPS coordinates, the vehicle speeds and the yaw rates can be detected by the vehicle sensor 22 and the satellite navigation device 26 of the vehicle 10 and those of other vehicles. The vehicle trajectories T can also include corrected trajectories in which histories of the traveling paths of the vehicle 10 and/or other vehicles are combined and/or corrected to form more feasible and accurate traveling paths. The vehicle trajectories T can be generated in a conventional manner, and thus will not be discussed in detail here. In the illustrated embodiment, the electronic controller

16 of the vehicle 10 and those of other vehicles each record the time-series data of GPS coordinates associated with the vehicle speed and/or the yaw rate while the vehicle 10 and other vehicles are each operated in a vehicle trajectory acquisition mode. The electronic controller 16 of the vehicle 10 and those of other vehicles each upload the time-series data via the wireless communicator 28 to a cloud service or vehicle network where the time-series data from the vehicle 10 and other vehicles are processed to generate the vehicle trajectories T. Then, the electronic controller 16 of the vehicle 10 and those of other vehicles each download the vehicle trajectories T from the cloud service or vehicle network via the wireless communicator 28 and store them in the computer memory 18 of the vehicle 10 and those of other vehicles. Of course, the vehicle 10 and other vehicles can be configured to generate vehicle trajectories from their time-series data and upload to the cloud service or vehicle network to share them between the vehicle 10 and other vehicles. In either case, the vehicle trajectories T can be associated with the road segments or map links L of the map M based on their geographic/GPS coordinates, respectively. Thus, in the illustrated embodiment, the computer memory 18 stores the vehicle trajectories T in association with the road segments or map links L of the map M, respectively.

Figure 4:
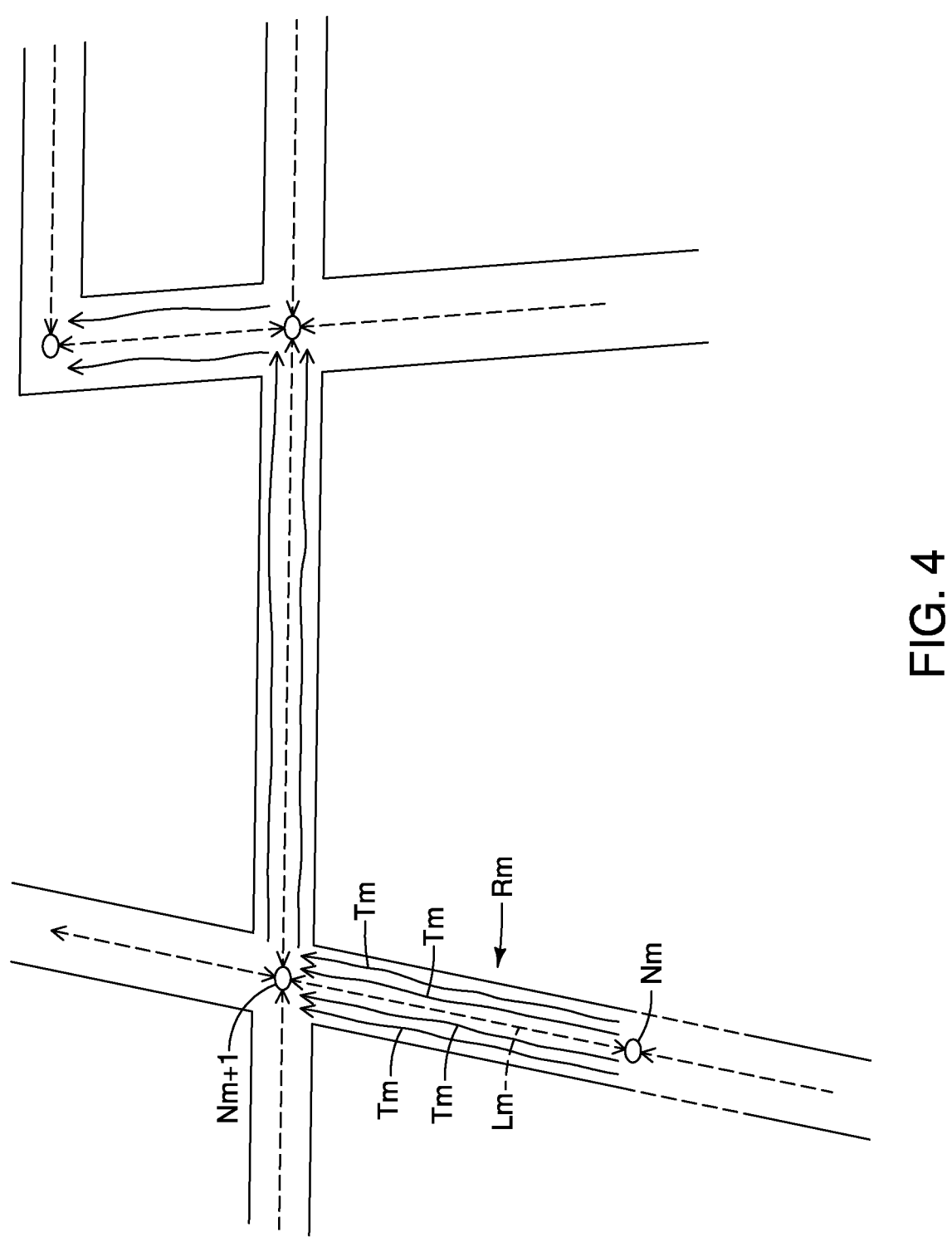
FIG. 4 is a schematic diagram showing a plurality of vehicle trajectories associated with one map link of the map or one road segment.

In the illustrated embodiment, the vehicle trajectories T includes a plurality sets of vehicle trajectories, with each set being associated with respective one of the road segments or map links L of the map M. In other words, in the illustrated embodiment, a plurality of vehicle trajectories Tm of the vehicle trajectories T can be associated with one road segment Rm (i.e., one map link Lm of the map M), as seen in FIG. 4. Thus, in the illustrated embodiment, these vehicle trajectories Tm associated with one road segment Rm can include redundant trajectories that are duplicate or highly similar trajectories.

In the illustrated embodiment, the electronic controller 16 of the vehicle 10 can optionally filter the redundant trajectories out from the computer memory 18 based on their spatial independence and keep only one of the redundant trajectories. For example, the electronic controller 16 of the vehicle 10 selects all possible pairs of the vehicle trajectories Tm associated with one road segment Rm, and then determines the spatial independence for each pair. More specifically, if the electronic controller 16 of the vehicle 10 determines that the distance between starting points of two vehicle trajectories Tm associated with one road segment Rm (i.e., one map link Lm) and the distance between ending points of the two vehicle trajectories Tm associated with the road segment Rm are both within a predetermined range, then the electronic controller 16 of the vehicle 10 determines that the two vehicle trajectories Tm associated with the road segment Rm are not spatially independent from each other. In other words, in this case, the electronic controller 16 of the vehicle 10 determines that the two vehicle trajectories Tm associated with the road segment Rm are redundant trajectories. Then, the electronic controller 16 of the vehicle 10 deletes one of the vehicle trajectories Tm from the computer memory 18 to keep the other one of the vehicle trajectories Tm. In this case, the predetermined range can be set to a value such that the electronic controller 16 can filter out vehicle trajectories extending on the same one of driving lanes (e.g., lanes) of the road segment Rm. Thus, with this filtering process, the computer memory 18 can keep one of the vehicle trajectories Tm for each one of the driving lanes of the road segment Rm.

Referring to FIG. 2, with the vehicle control of the vehicle control device 12, the electronic controller 16 performs a road-level route planning 40, a lane-level path planning 42, a decision making 44 and a path following 46. In the road-level route planning 40, the electronic controller 16 determines an optimal or planned route from a starting point or current vehicle position to a destination according to the current position of the vehicle 10 obtained through the satellite navigation device 26 of the vehicle 10 and the map database MD stored in the computer memory 18. The road-level route planning 40 can be performed in a conventional manner, and thus will not be described in detail. In the illustrated embodiment, as seen in FIG. 3, a planned route PR from a starting point Ps to a destination Pg are obtained as a combination of the map nodes N and the map links L that connects the map nodes N.

Figure 5:
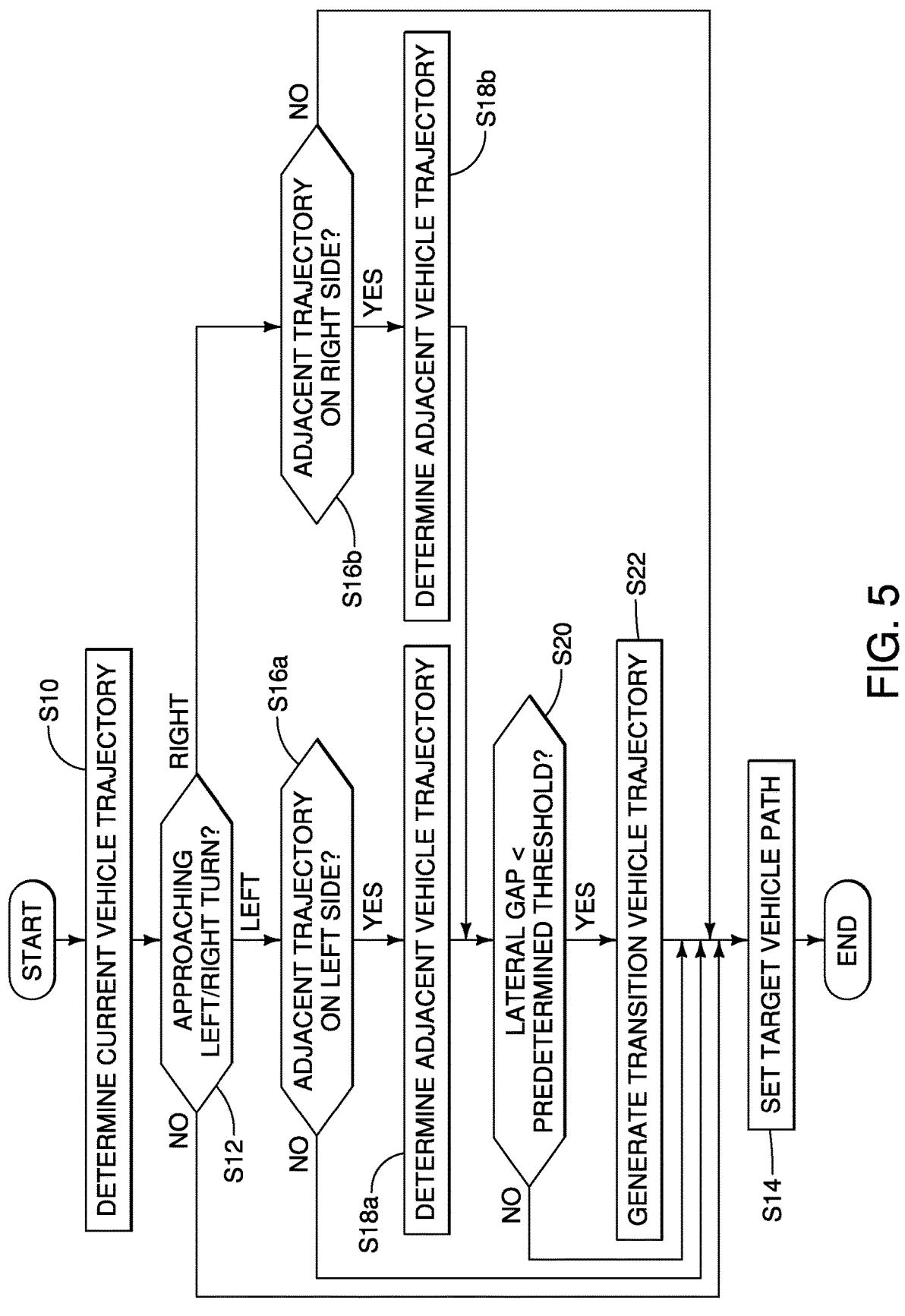
FIG. 5 is a flow chart of a lane-level path planning of the vehicle control illustrated in FIG. 2.
Figure 6:
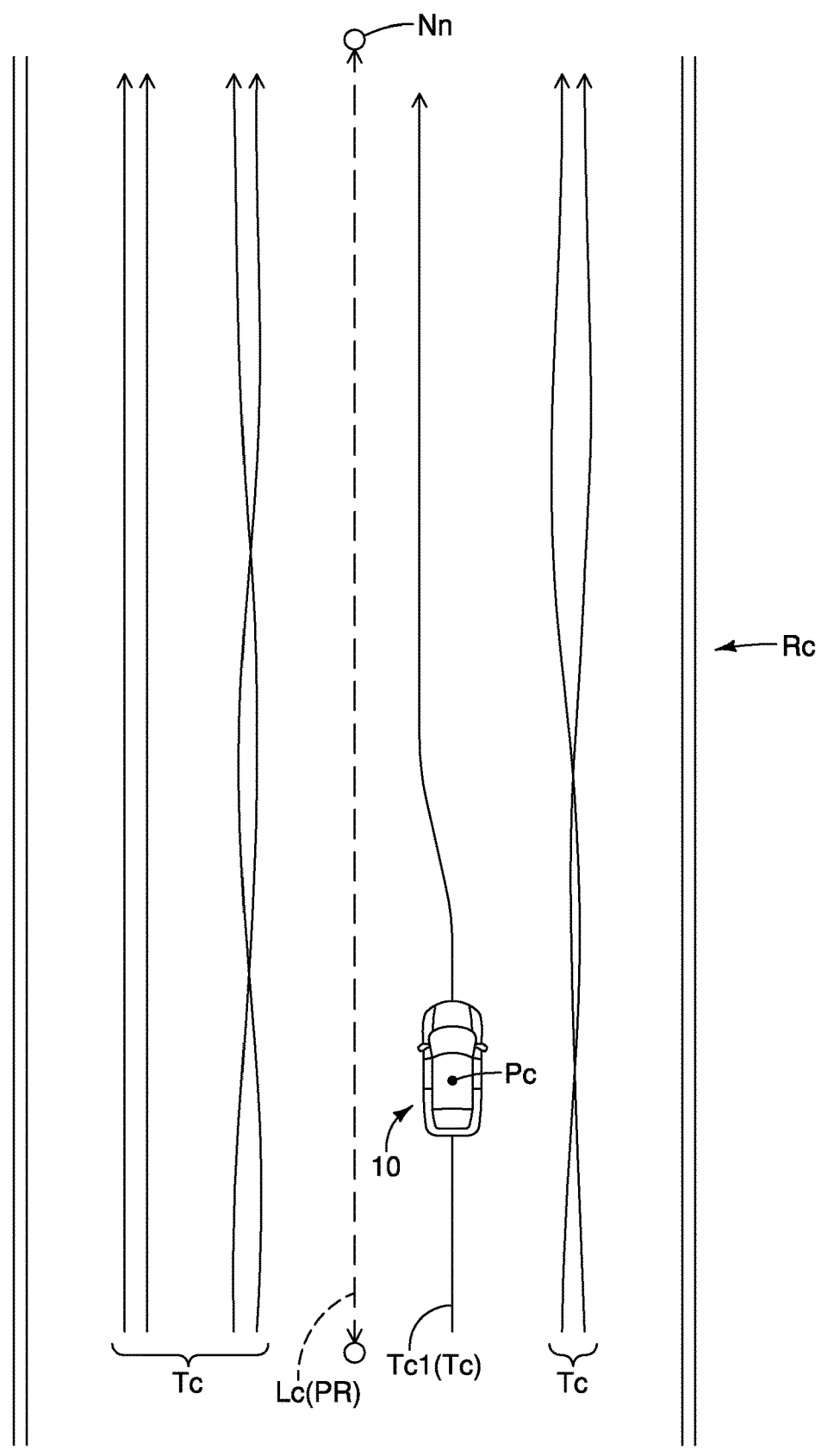
FIG. 6 is a schematic diagram showing a plurality of vehicle trajectories associated with a current map link of a current road segment on which the vehicle is traveling.
Figure 7:
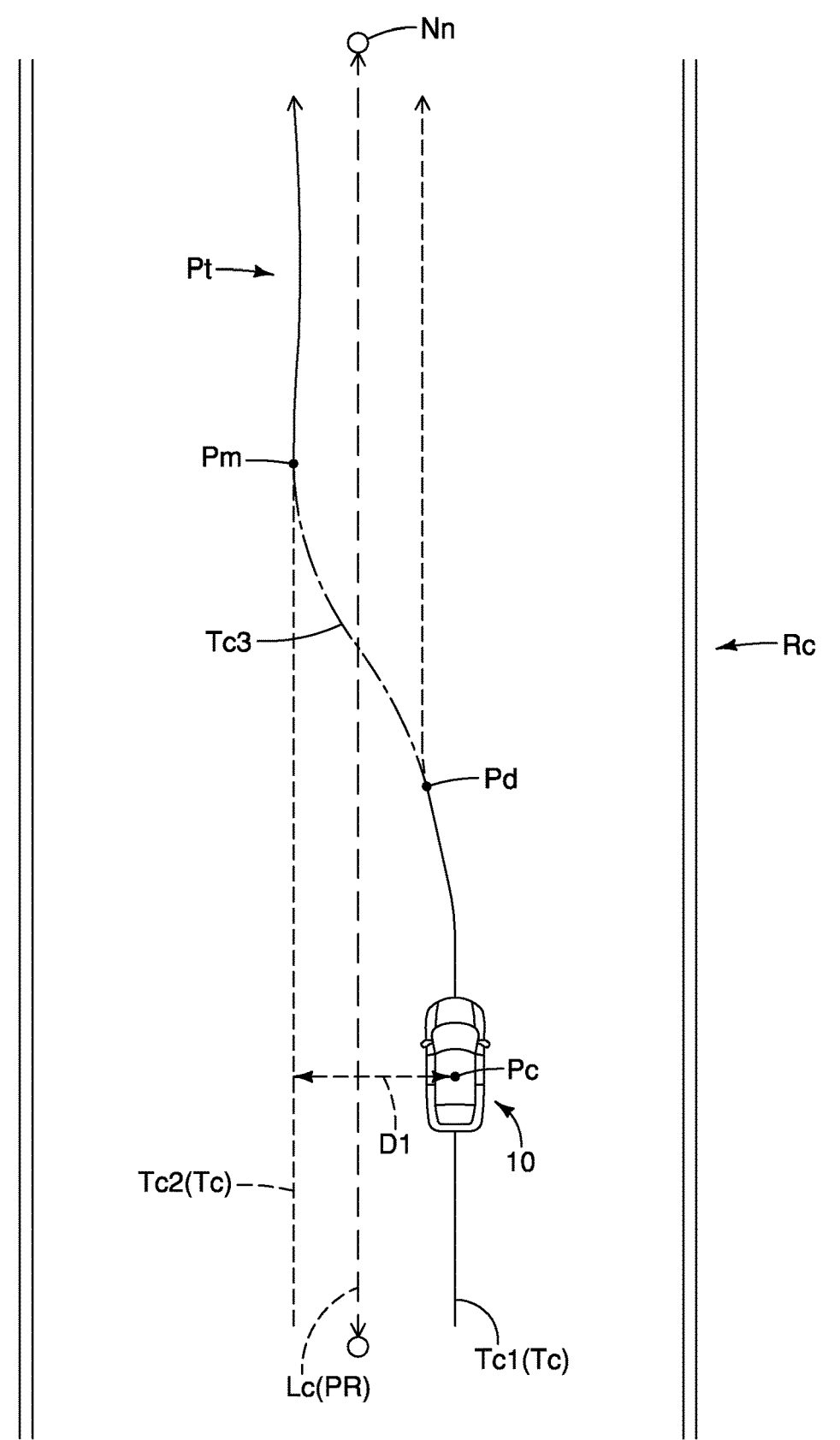
FIG. 7 is a schematic diagram showing a generation of a transition vehicle trajectory smoothly connecting a current vehicle trajectory and an adjacent vehicle trajectory.

Once the navigation of the vehicle 10 along the planned route PR generated by the road-level route planning 40 is started, the electronic controller 16 performs a lane-level path planning 42. Referring now to FIGS. 5 to 7, the lane-level path planning 42 of the present disclosure will be described. In the lane-level path planning 42, the electronic controller 16 acquires a current vehicle trajectory Tc1 (e.g., one of the vehicle trajectories) based on the current vehicle position of the vehicle 10 (step S10). Specifically, in step S10, the electronic controller 16 identifies a current map link Lc of a current road segment Rc on which the vehicle 10 is currently traveling based on a current vehicle position Pc of the vehicle 10 that is acquired through the satellite navigation device 26. Then, the electronic controller 16 chooses, as the current vehicle trajectory Tc1, a vehicle trajectory that is closest to the current vehicle position Pc of the vehicle 10 out of one or more vehicle trajectories Tc that are associated with the current map link Lc (the current road segment Rc) in the vehicle trajectories Tm stored in the computer memory 18. Thus, in step S10, the electronic controller 16 can determine the current vehicle trajectory Tc1 along which the vehicle 10 is traveling.

The electronic controller 16 further determines whether switching or transition from the current vehicle trajectory Tc1 to the other one of the vehicle trajectories Tc is needed (step S12). Specifically, the electronic controller 16 determines whether the switching from the current vehicle trajectory Tc1 to the other one of the vehicle trajectories Tc is needed by determining whether the vehicle 10 is approaching a turn (e.g., a left turn or a right turn) on the planned route PR along which the vehicle 10 is traveling. In the illustrated embodiment, the electronic controller 16 determines that the switching from the vehicle trajectory Tc1 to the other one of the vehicle trajectories Tc is needed in response to determining that the vehicle 10 is approaching a turn. This determination is continuously performed based on the planned route PR that has been generated by the road-level route planning 40 while the vehicle 10 is performing the vehicle control of the vehicle control device 12 shown in FIG. 2. Specifically, the electronic controller 16 determines that the vehicle 10 is approaching a turn by determining whether the vehicle 10 is approaching the turn within a predetermined distance, such as 500 to 1000 meters, or within a predetermined time interval, such as 30 to 60 seconds. Of course, these numbers or values for the predetermined distance and the predetermined time interval are not limited to these, and can be different numbers or values, as needed and/or desired.

Alternatively, the electronic controller 16 can determine that the vehicle 10 is approaching a turn in different manner. For example, the electronic controller 16 can determine whether the vehicle 10 is approaching a turn by determining whether the planned route PR indicates a turn at the next map node Nn (e.g., an ending map node of the current map link Lc) every time the electronic controller 16 identifies the current map link Lc on which the vehicle 10 is currently traveling. In the illustrated embodiment, in step S12, the electronic controller 16 also determines whether the turn is a left turn or a right turn based on the planned route PR.

If the electronic controller 16 determines that the vehicle 10 is not approaching a turn ("NO" in step S12), then the electronic controller 16 sets the current vehicle trajectory Tc1 as a target vehicle path Pt and ends the lane-level path planning 42 (step S14).

On the other hand, if the electronic controller 16 determines that the vehicle 10 is approaching a left turn ("LEFT" in step S12), then the electronic controller 16 determines whether the vehicle trajectories Tc that are associated with the current map link Lc include a vehicle trajectory that is adjacent (or directly adjacent) to the current vehicle trajectory Tc1 in a direction of turn (i.e., on the left side) and is directed in the same travel direction as the current vehicle trajectory Tc1 (step S16a).

If the electronic controller 16 determines that the vehicle trajectories Tc does not include the vehicle trajectory that is adjacent to the current vehicle trajectory Tc1 in the direction of turn (i.e., on the left side) and is directed in the same travel direction as the current vehicle trajectory Tc1 ("NO" in step S16a), then the electronic controller 16 sets the current vehicle trajectory Tc1 as a target vehicle path Pt and ends the lane-level path planning 42 (step S14). This implies a situation in which the vehicle 10 has reached the left-most driving lane of the current road segment Rc on which the vehicle 10 is traveling and is ready for the left turn.

On the other hand, if the electronic controller 16 determines that the vehicle trajectories Tc include that the vehicle trajectories Tc include the vehicle trajectory that is adjacent to the current vehicle trajectory Tc1 in the direction of turn (i.e., on the left side) and is directed in the same travel direction as the current vehicle trajectory Tc1 ("YES" in step S16a), then the electronic controller 16 acquires or chooses the vehicle trajectory that is adjacent to the current vehicle trajectory Tc1 in the direction of turn (i.e., on the left side) and is directed in the same travel direction as the current vehicle trajectory Tc1 as an adjacent vehicle trajectory Tc2 from the computer memory 18 (step S18a).

Similarly, if the electronic controller 16 determines that the vehicle 10 is approaching a right turn ("RIGHT" in step S12), then the electronic controller 16 determines whether the vehicle trajectories Tc that are associated with the current map link Lc include a vehicle trajectory that is adjacent (or directly adjacent) to the current vehicle trajectory Tc1 in a direction of turn (i.e., on the right side) and is directed in the same travel direction as the current vehicle trajectory Tc1 (step S16b).

If the electronic controller 16 determines that the vehicle trajectories Tc does not include the vehicle trajectory that is adjacent to the current vehicle trajectory Tc1 in the direction of turn (i.e., on the right side) and is directed in the same travel direction as the current vehicle trajectory Tc1 ("NO" in step S16b), then the electronic controller 16 sets the current vehicle trajectory Tc1 as a target vehicle path Pt and ends the lane-level path planning 42 (step S14). This implies a situation in which the vehicle 10 has reached the right-most driving lane of the current road segment Rc on which the vehicle 10 is traveling and is ready for the left or right turn.

On the other hand, if the electronic controller 16 determines that the vehicle trajectories Tc include that the vehicle trajectories Tc include the vehicle trajectory that is adjacent to the current vehicle trajectory Tc1 in the direction of turn (i.e., on the right side) and is directed in the same travel direction as the current vehicle trajectory Tc1 ("YES" in step S16b), then the electronic controller 16 acquires or chooses the vehicle trajectory that is adjacent to the current vehicle trajectory Tc1 in the direction of turn (i.e., on the right side) and is directed in the same travel direction as the current vehicle trajectory Tc1 as an adjacent vehicle trajectory Tc2 from the computer memory 18 (step S18b).

In the illustrated embodiment, the electronic controller 16 further calculates a lateral gap or distance D1 (FIG. 7) between the current vehicle trajectory Tc1 and the adjacent vehicle trajectory Tc2 that has been acquired or chosen in step S18a or S18b, and compares the lateral gap D1 with a predetermined threshold (step S20). In particular, in step S20, the electronic controller 16 determines whether the lateral gap D1 is smaller than the predetermined threshold for determining whether the vehicle 10 can transit from the current vehicle trajectory Tc1 to the adjacent vehicle trajectory Tc2. In the illustrated embodiment, the lateral gap D1 can be calculated as a lateral distance from the current vehicle position Pc on the current vehicle trajectory Tc1 to the adjacent vehicle trajectory Tc2 in a lateral direction of the vehicle 10 or in a perpendicular direction to the current vehicle trajectory Tc1 at the current vehicle position Pc. Of course, the lateral gap D1 can be calculated in different manners. For example, the lateral gap D1 can be calculated as a lateral distance from a future vehicle position on the current vehicle trajectory Tc1 at a predetermined future timing, such as a timing when an actual transition from the current vehicle trajectory Tc1 to the adjacent vehicle trajectory Tc2 occurs, to the adjacent vehicle trajectory Tc2 in a lateral direction of the vehicle 10 or in a perpendicular direction to the current vehicle trajectory Tc1 at the future vehicle position. In the illustrated embodiment, the predetermined threshold can be set to 3.0 to 4.0 meters according to a normal driving lane width of roads for preventing the vehicle 10 from transitioning across more than one driving lane in a single maneuver, for example. Of course, these numbers or values for the predetermined threshold are not limited to these, and can be different numbers or values, as needed and/or desired.

If the electronic controller 16 determines that the lateral gap D1 is not smaller than the predetermined threshold ("NO" in step S20), then the electronic controller 16 sets the current vehicle trajectory Tc1 as a target vehicle path Pt and ends the lane-level path planning 42 (step S14).

On the other hand, if the electronic controller 16 determines that the lateral gap D1 is smaller than the predetermined threshold ("YES" in step S20), then the electronic controller 16 generates a transition vehicle trajectory Tc3 that smoothly connects the current vehicle trajectory Tc1 to the adjacent vehicle trajectory Tc2 (step S22). In the illustrated embodiment, as seen in FIG. 7, the transition vehicle trajectory Tc3 has a sigmoid curve. However, the transition vehicle trajectory Tc3 is not limited to this shape, and can have different shape in which one or more transition curves, such as a spline curve, a clothoid curve, etc. are combined. In the illustrated embodiment, the electronic controller 16 generates the transition vehicle trajectory Tc3 such that the transition vehicle trajectory Tc3 diverges from the current vehicle trajectory Tc1 at a diverging point Pd on the current vehicle trajectory Tc1 and merges to the adjacent vehicle trajectory Tc2 at a merging point Pm on the adjacent vehicle trajectory Tc2. In the illustrated embodiment, the diverging point Pd is set to a future vehicle position on the current vehicle trajectory Tc1 that is spaced away from the current vehicle position Pc in a traveling direction of the vehicle 10 by a predetermined distance or by a predetermined time interval. Also, the merging point Pm is set to a future vehicle position on the adjacent vehicle trajectory Tc2 that is spaced away from the diverging point Pd in the traveling direction of the vehicle 10 and is determined by the shape of the transition vehicle trajectory Tc3.

After the electronic controller 16 generates the transition vehicle trajectory Tc3, the electronic controller 16 sets a combination of the current vehicle trajectory Tc1 up to the diverging point Pd, the transition vehicle trajectory Tc3 and the adjacent vehicle trajectory Tc2 from the merging point Pm onwards as a target vehicle path Pt and ends the lane-level path planning 42 (step S14).

As seen in FIG. 2, when the electronic controller 16 sets the current vehicle trajectory Tc1 as a target vehicle path Pt in step S14, the electronic controller 16 performs the path following control 46 according to the target vehicle path Pt. Specifically, the electronic controller 16 controls the vehicle 10 to follow the target vehicle path Pt (i.e., the current vehicle trajectory Tc1) while detecting the traveling environment of the vehicle 10 by the environmental sensor 20 (e.g., the Lidar, the radar sensor, the camera, etc.) as part of the autonomous driving control or the driving assist control. The path following control 46 according to the target vehicle path Pt can be performed in a conventional manner, and will not be described in detail herein. Then, while performing the path following control 46, the process returns to the lane-level path planning 42 and repeats the processes shown in FIG. 5 (and FIG. 8 if necessary) until the vehicle 10 arrives the destination Pg on the planned route PR or until the autonomous driving control or the driving assist control are disengaged.

Figure 8:
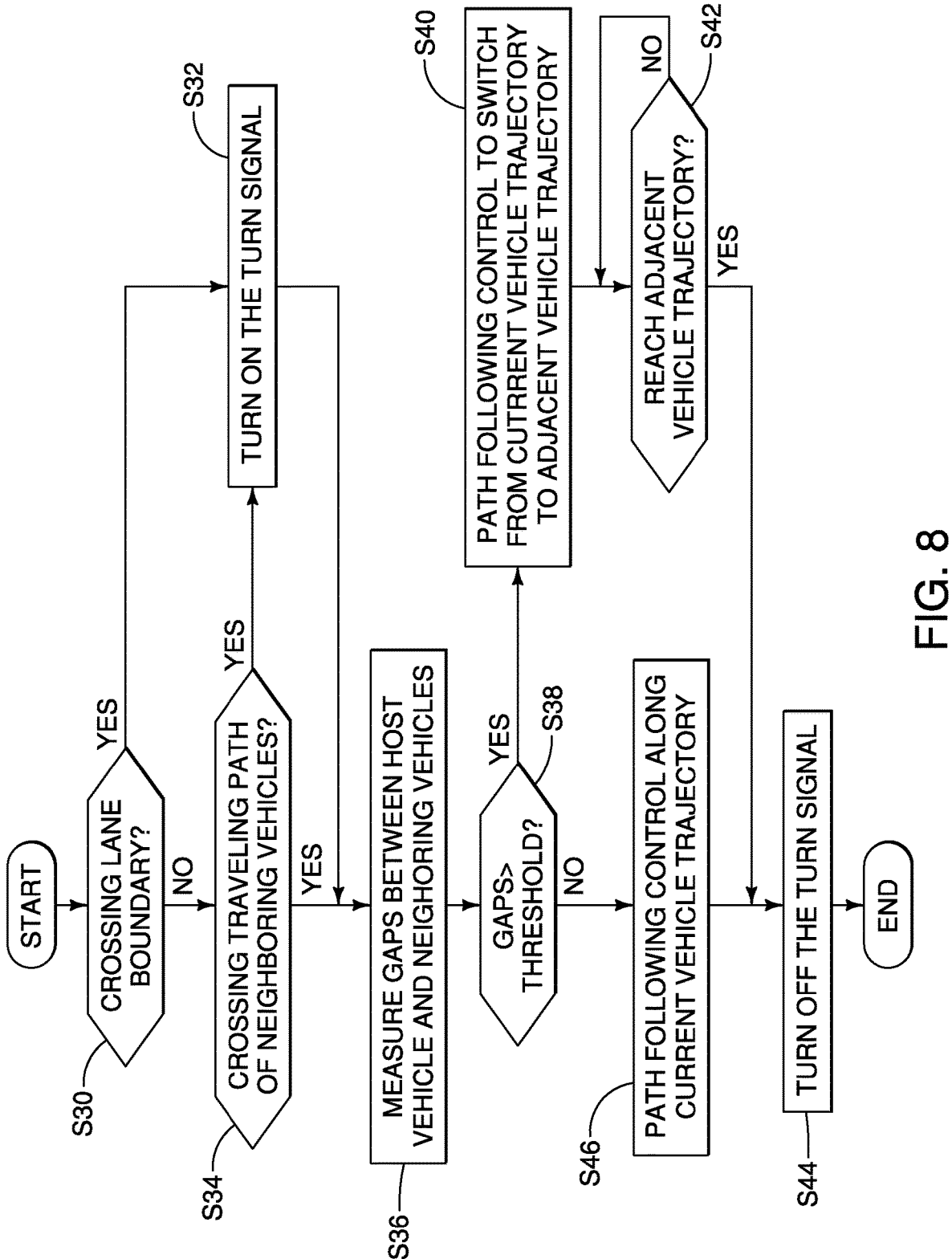
FIG. 8 is a flow chart of a decision making and a path following of the vehicle control illustrated in FIG. 2.
Figure 9:
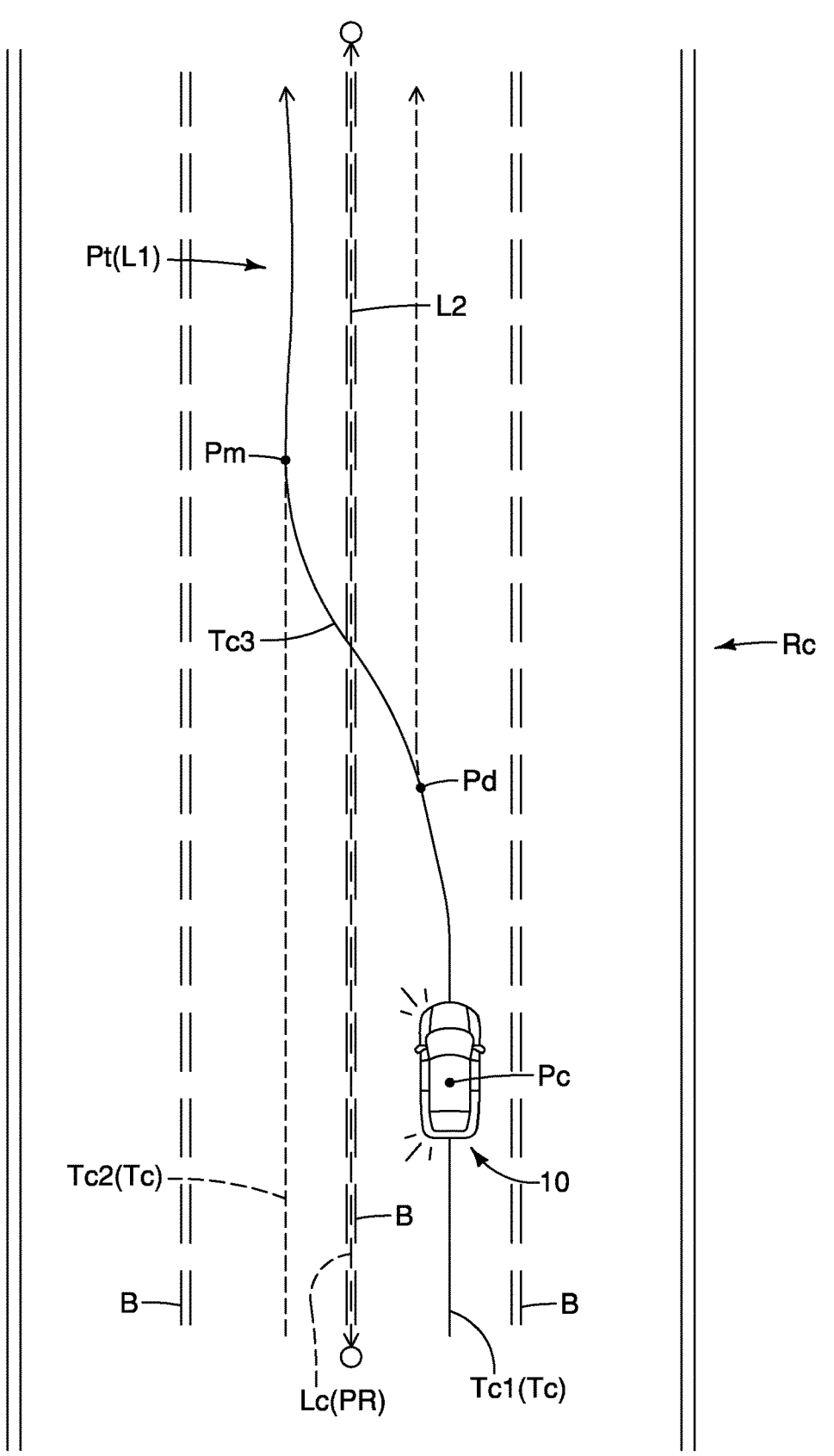
FIG. 9 is a schematic diagram showing a situation in which the vehicle crosses a lane boundary of the current road segment on which the vehicle is traveling.
Figure 10:
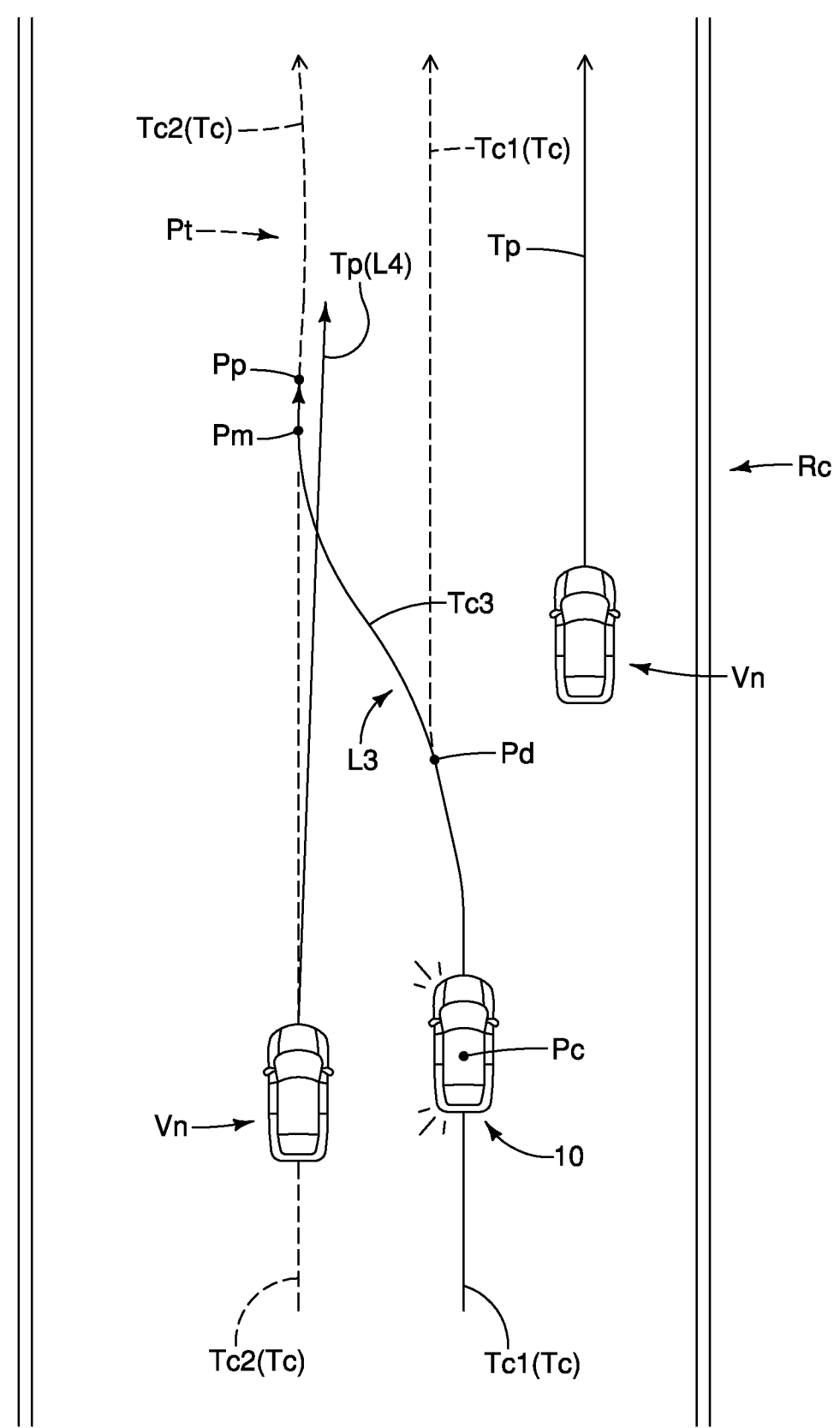
FIG. 10 is a schematic diagram showing a situation in which the vehicle crosses a traveling path of a neighboring vehicle.

On the other hand, when the electronic controller 16 sets the combination of the current vehicle trajectory Tc1 up to the diverging point Pd, the transition vehicle trajectory Tc3 and the adjacent vehicle trajectory Tc2 from the merging point Pm onwards as a target vehicle path Pt in step S14, the electronic controller 16 performs the decision making 44 and then the path following 46. Referring now to FIGS. 8 to 10, the decision making 44 and the path following 46 will be described in detail.

As seen in FIGS. 8 and 9, the electronic controller 16 first determines whether the target vehicle path Pt set in step S14 crosses a lane boundary B (e.g., a lane line) on the current road segment Rc on which the vehicle 10 is traveling (step S30). In other words, the electronic controller 16 determines whether the vehicle 10 crosses a lane boundary B during the switching from the current vehicle trajectory Tc1 to the adjacent vehicle trajectory Tc2. Specifically, the electronic controller 16 performs a lane recognition to identify lane boundaries B on the current road segment Rc on which the vehicle 10 is traveling using the detection result of the environmental sensor 20. In particular, the electronic controller 16 processes real-time images or data of the current road segment Rc ahead captured by the environmental sensor 20. For example, the electronic controller 16 analyses pixel data of the real-time images or data of the current road segment Rc ahead to extract or distinguish the lane boundaries B from other objects and road features by performing edge detection, line fitting, and pattern recognition techniques. Then, the electronic controller 16 determines whether a line (i.e., a curved line or a straight line) or line segment L1 along the target vehicle path Pt intersects a line or line segment L2 along any one of the lane boundaries B to determine whether the target vehicle path Pt crosses a lane boundary B on the current road segment B on which the vehicle 10 is traveling. The calculation of intersection of lines are well known in the art, and will not be described in detail. Of course, the determination in step S30 is not limited to this, and whether the vehicle 10 crosses a lane boundary B during the switching from the current vehicle trajectory Tc1 to the adjacent vehicle trajectory Tc2 can be determined in different manner, as needed and/or desired.

If the electronic controller 16 determines that the target vehicle path Pt crosses a lane boundary B on the current road segment B on which the vehicle 10 is traveling ("YES" in step S30), then the electronic controller 16 turns on the turn signals TS of the vehicle 10 according to the direction of the turn determined in step S12 (step S32). In other words, the electronic controller 16 turns on the turn signals TS of the vehicle 10 upon determining that the vehicle 10 crosses a lane boundary B during the switching from the current vehicle trajectory Tc1 to the adjacent vehicle trajectory Tc2 according to a detection result of the lane boundary B by the environmental sensor 20. Then, the process proceeds to steps S36 and S38, which will be described below.

On the other hand, if the electronic controller 16 determines that the target vehicle path Pt does not cross a lane boundary B on the current road segment Rc on which the vehicle 10 is traveling ("NO" in step S30), then the electronic controller 16 further determines whether the target vehicle path Pt crosses a traveling path Tp of a neighboring vehicle Vn (step S34), as seen in FIGS. 8 and 10. In other words, the electronic controller 16 determines whether the vehicle 10 crosses a traveling path Tp of a neighboring vehicle Vn during the switching from the current vehicle trajectory Tc1 to the adjacent vehicle trajectory Tc2. Specifically, the electronic controller 16 performs an object detection to detect and track neighboring vehicles Vn traveling around the vehicle 10 using the detection result of the environmental sensor 20. In particular, the electronic controller 16 process real-time images or data (point clouds) of the neighboring vehicles Vn captured by the environmental sensor 20 to detect the vehicle behavior of the neighboring vehicles Vn, such as a relative velocity and/or a relative position of the neighboring vehicles Vn relative to the vehicle 10 in a longitudinal direction (a traveling direction) and a lateral direction of the vehicle 10. Then, the electronic controller 16 calculates or predicts future traveling paths Tp of the neighboring vehicles Vn. In other words, the electronic controller 16 estimates how the positions and/or velocities of the neighboring vehicles Vn change over time. For example, the electronic controller 16 calculates or predicts the future traveling paths Tp of the neighboring vehicles Vn up until a future arrival timing when the vehicle 10 arrives a predetermined point Pp on the adjacent vehicle trajectory Tc2 after switching from the current vehicle trajectory Tc1 to the adjacent vehicle trajectory Tc2. In the illustrated embodiment, the predetermined point Pp can be located separate from the merging point Pm between the transition vehicle trajectory Tc3 and the adjacent vehicle trajectory Tc2 or located at the merging point Pm. Then, the electronic controller 16 determines whether a line segment (i.e., a curved line segment or a straight line segment) L3 along the target vehicle path Pt up until the future arrival timing when the vehicle 10 arrives the predetermined point Pp on the adjacent vehicle trajectory Tc2 intersects a line segment L4 along one of the future traveling paths Tp of the neighboring vehicles Vn to determine whether the target vehicle path Pt crosses a traveling path Tp of a neighboring vehicle Vn. The calculation of intersection of line segments are well known in the art, and will not be described in detail. Of course, the determination in step S34 is not limited to this, and whether the vehicle 10 crosses a traveling path Tp of a neighboring vehicle Vn during the switching from the current vehicle trajectory Tc1 to the adjacent vehicle trajectory Tc2 can be determined in different manner, as needed and/or desired.

If the electronic controller 16 determines that the target vehicle path Pt crosses a traveling path Tp of a neighboring vehicle Vn ("YES" in step S34), then the electronic controller 16 turns on the turn signals TS of the vehicle 10 according to the direction of the turn determined in step S12 (step S32). In other words, the electronic controller 16 turns on the turn signals TS of the vehicle 10 upon determining that the vehicle 10 crosses a traveling path Tp of a neighboring vehicle Vn during the switching from the current vehicle trajectory Tc1 to the adjacent vehicle trajectory Tc2 according to a detection result of the vehicle behavior of the neighboring vehicle Vn by the environmental sensor 20. Then, the process proceeds to steps S36 and S38, which will be described below.

On the other hand, if the electronic controller 16 determines that the target vehicle path Pt does not cross a traveling path Tp of a neighboring vehicle Vn ("NO" in step S34), then the process proceeds to steps S36 and S38.

In steps S36 and S38, the electronic controller 16 determines possible collisions with the neighboring vehicles Vn using detection results of the environmental sensor 20. In the illustrated embodiment, the electronic controller 16 measures gaps between the vehicle 10 and the neighboring vehicles Vn (step S36). In particular, the electronic controller 16 process real-time images or data (point clouds) of the neighboring vehicles Vn captured by the environmental sensor 20 to measure lateral and longitudinal gaps between the vehicle 10 and the neighboring vehicles Vn in the lateral and longitudinal directions of the vehicle 10, respectively. Then, the electronic controller 16 compares the lateral and longitudinal gaps measured in step S36 with predetermined lateral and longitudinal thresholds, respectively (step S38).

If all of the lateral and longitudinal gaps of the neighboring vehicles are larger than the predetermined lateral and longitudinal thresholds, respectively ("YES" in step S38), then the electronic controller 16 determines that collisions with the neighboring vehicles Vn will not occur, and performs the path following control 46 according to the target vehicle path Pt (step S40). Specifically, the electronic controller 16 controls the vehicle 10 to follow the target vehicle path Pt (i.e., the combination of the current vehicle trajectory Tc1 up to the diverging point Pd, the transition vehicle trajectory Tc3 and the adjacent vehicle trajectory Tc2 from the merging point Pm onwards) while detecting the traveling environment of the vehicle 10 by the environmental sensor 20 (e.g., the Lidar, the radar sensor, the camera, etc.) as part of the autonomous driving control or the driving assist control. The path following control 46 according to the target vehicle path Pt can be performed in a conventional manner, and will not be described in detail herein.

After starting the path following control 46 in step S40, the electronic controller 16 continuously determines or monitors whether the vehicle 10 has reached the adjacent vehicle trajectory Tc2 based on the current vehicle position Pc of the vehicle 10 (step S42). In the illustrated embodiment, the electronic controller 16 repeatedly determines whether the vehicle 10 has reached the adjacent vehicle trajectory Tc2 ("NO" in step S42) until the electronic controller 16 determines that the vehicle 10 has reached the adjacent vehicle trajectory Tc2 ("YES" in step S42).

If the electronic controller 16 determines that the vehicle 10 has reached the adjacent vehicle trajectory Tc2 ("YES" in step S42), then the electronic controller 16 turns off the turn signals TS of the vehicle 10 (step S44) and ends the lane change or transition from the current vehicle trajectory Tc1 to the adjacent vehicle trajectory. In the illustrated embodiment, the electronic controller 16 continues the path following control 46 according to the target vehicle path Pt. In particular, as seen in FIG. 2, while performing the path following control 46, the process returns to the lane-level path planning 42 and repeats the processes shown in FIG. 5 (and FIG. 8 if necessary) until the vehicle 10 arrives the destination Pg on the planned route PR or until the autonomous driving control or the driving assist control are disengaged.

On the other hand, if any one of the lateral and longitudinal gaps of the neighboring vehicles Vn is not larger than the predetermined lateral and longitudinal thresholds, respectively ("NO" in step S38), then the electronic controller 16 determines possible collisions. In this case, the electronic controller 16 resets the current vehicle trajectory Tc1 as the target vehicle path Pt to cancel the lane change or transition from the current vehicle trajectory Tc1 to the adjacent vehicle trajectory Tc2 (step S46), and performs the path following control 46 according to the target vehicle path Pt (i.e., the current vehicle trajectory Tc1) (step S46). Specifically, the electronic controller 16 controls the vehicle 10 to follow the target vehicle path Pt (i.e., the current vehicle trajectory Tc1) while detecting the traveling environment of the vehicle 10 by the environmental sensor 20 (e.g., the Lidar, the radar sensor, the camera, etc.) as part of the autonomous driving control or the driving assist control. The path following control 46 according to the target vehicle path Pt can be performed in a conventional manner, and will not be described in detail herein. Furthermore, the electronic controller 16 turns off the turn signals TS of the vehicle 10 (step S44). In the illustrated embodiment, the electronic controller 16 continues the path following control 46 according to the target vehicle path Pt. In particular, as seen in FIG. 2, while performing the path following control 46, the process returns to the lane-level path planning 42 and repeats the processes shown in FIG. 5 (and FIG. 8 if necessary) until the vehicle 10 arrives the destination Pg on the planned route PR or until the autonomous driving control or the driving assist control are disengaged.

In the illustrated embodiment, in steps S36 and S38, the electronic controller 16 determines possible collisions with the neighboring vehicles based on the lateral and longitudinal gaps between the vehicle 10 and the neighboring vehicles Vn. Of course, the possible collisions can be determined in different manner, as needed and/or desired. For example, the electronic controller 16 can calculate or predict the future traveling paths Tp of the neighboring vehicles Vn in the same manner as in step S34, and then can calculate or predict how the relative positions of the neighboring vehicles Vn relative to the vehicle 10 change over time. In other words, the electronic controller 16 can calculate or predict how the distances between the neighboring vehicles Vn and the vehicle 10 change over time. The electronic controller 16 can further compare the distances between the neighboring vehicles Vn and the vehicle 10 over time with a predetermined threshold. Then, if any one of the distances between the neighboring vehicles Vn and the vehicle 10 over time is smaller than the predetermined threshold, then the electronic controller 16 can determine possible collisions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle control device. Accordingly, these terms, as utilized to describe the present invention should be interpreted relative to a vehicle equipped with the vehicle control device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle control device comprising:
a computer memory configured to store vehicle trajectories in association with road segments of a map;
an environmental sensor configured to detect traveling environment of a host vehicle;
a processor configured to
determine one of the vehicle trajectories along which the host vehicle is traveling,
determine whether switching from the one of the vehicle trajectories to the other one of the vehicle trajectories is needed, and control a turn signal of the host vehicle according to a detection result of the environmental sensor in response to determining that the switching from one of the vehicle trajectories to another one of the vehicle trajectories, the vehicle trajectories including sensor-based motion histories of the host vehicle and/or other vehicles along the road segments or corrected motion histories obtained based on the sensor-based motion histories along the road segments.

2. The vehicle control device according to claim 1, wherein the environmental sensor is configured to detect at least one of a line of a lane on which the host vehicle is traveling and a vehicle behavior of a neighboring vehicle.

3. The vehicle control device according to claim 1, wherein the environmental sensor includes at least one of a lidar sensor, a radar sensor and an image sensor.

4. The vehicle control device according to claim 2, wherein the processor is configured to turn on the turn signal of the host vehicle upon determining that the vehicle crosses the lane line during the switching from one of the vehicle trajectories to another one of the vehicle trajectories according to a detection result of the lane line by the environmental sensor.

5. The vehicle control device according to claim 2, wherein the processor is configured to turn on the turn signal of the host vehicle upon determining that the vehicle crosses a traveling path of the neighboring vehicle during the switching from one of the vehicle trajectories to another one of the vehicle trajectories according to a detection result of the vehicle behavior of the neighboring vehicle by the environmental sensor.

6. The vehicle control device according to claim 1, wherein the processor is configured to determine whether the switching from one of the vehicle trajectories to another one of the vehicle trajectories is needed by determining whether the host vehicle is approaching a turn on a planned route along which the host vehicle is traveling.

7. The vehicle control device according to claim 6, wherein the processor is configured to determine that the switching from one of the vehicle trajectories to another one of the vehicle trajectories is needed in response to determining that the host vehicle is approaching the turn.

8. The vehicle control device according to claim 1, wherein the processor is configured to generate a transition vehicle trajectory that smoothly connects one of the vehicle trajectories to another one of the vehicle trajectories in response to determining that the switching from the one of the vehicle trajectories to the other one of the vehicle trajectories is needed.

9. The vehicle control device according to claim 8, wherein the transition vehicle trajectory has a sigmoid curve.

10. The vehicle control device according to claim 8, wherein the processor is configured to control the host vehicle to travel along the transition vehicle trajectory to switch from one of the vehicle trajectories to another one of the vehicle trajectories.

11. The vehicle control device according to claim 10, wherein the processor is configured to turn off the turn signal of the host vehicle in response to determining that the host vehicle has reached the other one of the vehicle trajectories.

12. The vehicle control device according to claim 1, wherein the processor is configured to acquire the one of the vehicle trajectories from the computer memory based on a current position of the host vehicle.

13. The vehicle control device according to claim 6, wherein the processor is configured to acquire, as the other one of the vehicle trajectories, an adjacent vehicle trajectory adjacent to the one of the vehicle trajectories from the computer memory according to a direction of the turn.

14. The vehicle control device according to claim 1, wherein one of the vehicle trajectories to another one of the vehicle trajectories are stored in the computer memory in association with a road segment on which the vehicle is traveling.

15. A vehicle control method comprising:

storing vehicle trajectories in association with road segments of a map;

determining one of the vehicle trajectories along which a host vehicle is traveling;

determining whether switching from one of the vehicle trajectories to another one of the vehicle trajectories is needed; and controlling a turn signal of the host vehicle according to a detection result of traveling environment of the host vehicle in response to determining that the switching from one of the vehicle trajectories to another one of the vehicle trajectories is needed, the vehicle trajectories including sensor-based motion histories of the host vehicle and/or other vehicles along the road segments or corrected motion histories obtained based on the sensor-based motion histories along the road segments.

* * * * *